(12) United States Patent
Chesack et al.

(10) Patent No.: US 7,137,503 B2
(45) Date of Patent: Nov. 21, 2006

(54) AUGER BRUSH

(75) Inventors: Greg Chesack, Kenosha, WI (US); Robert Grabhorn, Great Bend, KS (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/906,916

(22) Filed: Mar. 11, 2005

(65) Prior Publication Data

US 2005/0247544 A1 Nov. 10, 2005

Related U.S. Application Data

(60) Provisional application No. 60/521,218, filed on Mar. 12, 2004.

(51) Int. Cl.
  *B65G 33/00* (2006.01)
  *B65G 45/00* (2006.01)
(52) U.S. Cl. .............. 198/657; 198/496; 198/670; 198/671; 198/677; 405/241
(58) Field of Classification Search ........... 198/657, 198/670, 671, 496, 677; 405/241
See application file for complete search history.

(56) References Cited

U.S. PATENT DOCUMENTS

| | | | | | |
|---|---|---|---|---|---|
| 701,969 | A | * | 6/1902 | Van Arsdell | ........... 403/256 |
| 2,577,810 | A | * | 12/1951 | Rosan | ............... 411/109 |
| 3,136,407 | A | * | 6/1964 | Poul | ................. 198/657 |
| 3,684,082 | A | * | 8/1972 | Wardell | ............ 198/493 |
| 3,695,173 | A | * | 10/1972 | Cox | ..................... 100/74 |
| 4,496,086 | A | * | 1/1985 | Duchadeau | ......... 222/412 |
| 5,573,660 | A | * | 11/1996 | Eicker et al. | ........ 210/162 |
| 6,536,602 | B1 | | 3/2003 | Ruescher et al. | |

\* cited by examiner

*Primary Examiner*—Gene O. Crawford
*Assistant Examiner*—Leslie A. Nicholson, III
(74) *Attorney, Agent, or Firm*—Locke Liddell & Sapp LLP

(57) ABSTRACT

An auger assembly suitable for use with a food separator is provided with a removable brush. The auger assembly includes an auger defining a channel around the crest thereof. A brush is received in the channel and defining a flange at each end thereof. First and second retaining clips are removably attached to opposite ends of the auger, with each retaining clip defining an opening therethrough that receives a respective flange to secure the brush within the channel.

14 Claims, 3 Drawing Sheets

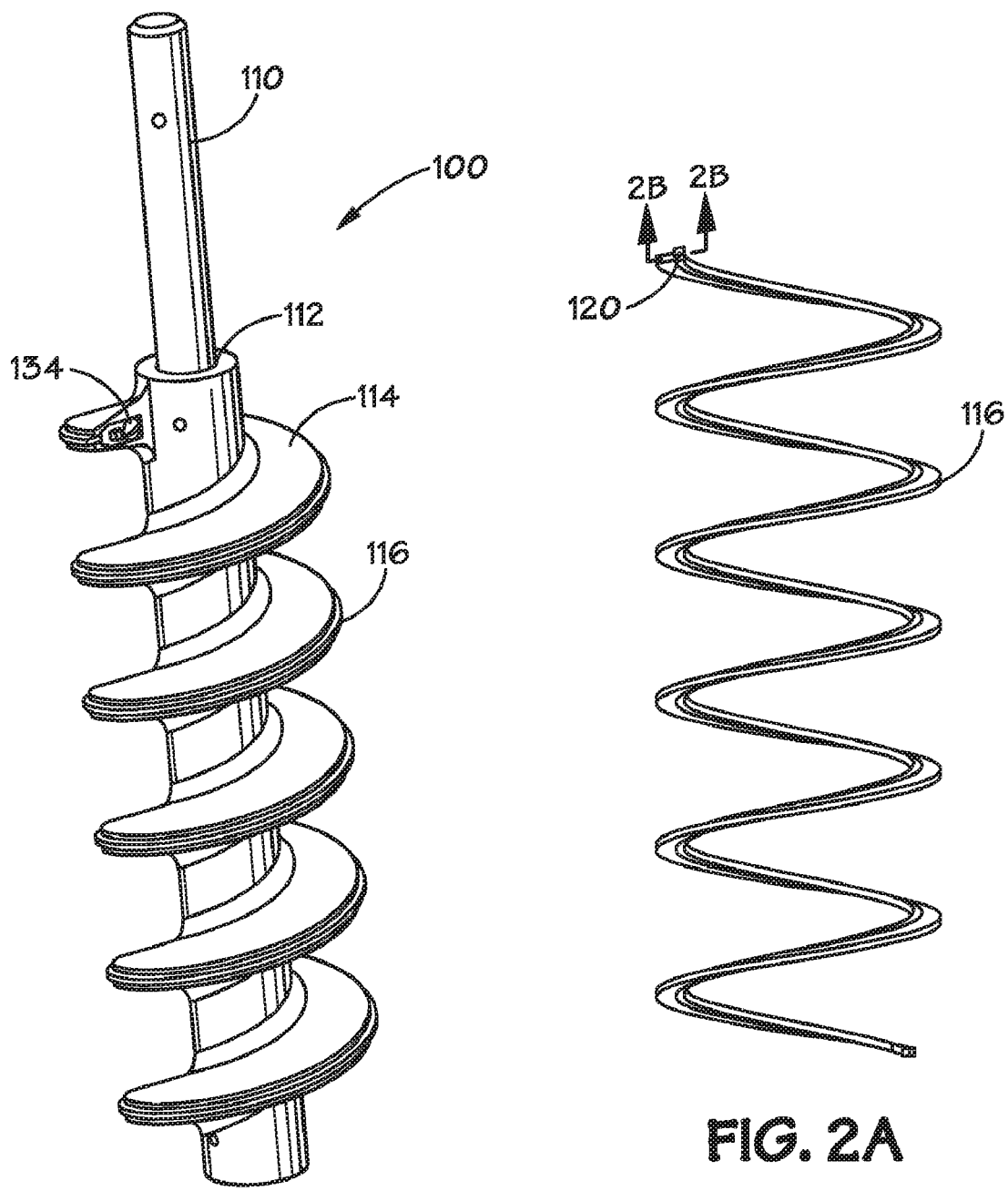
FIG. 1
FIG. 2A
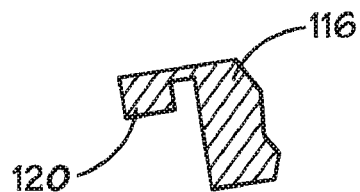
FIG. 2B

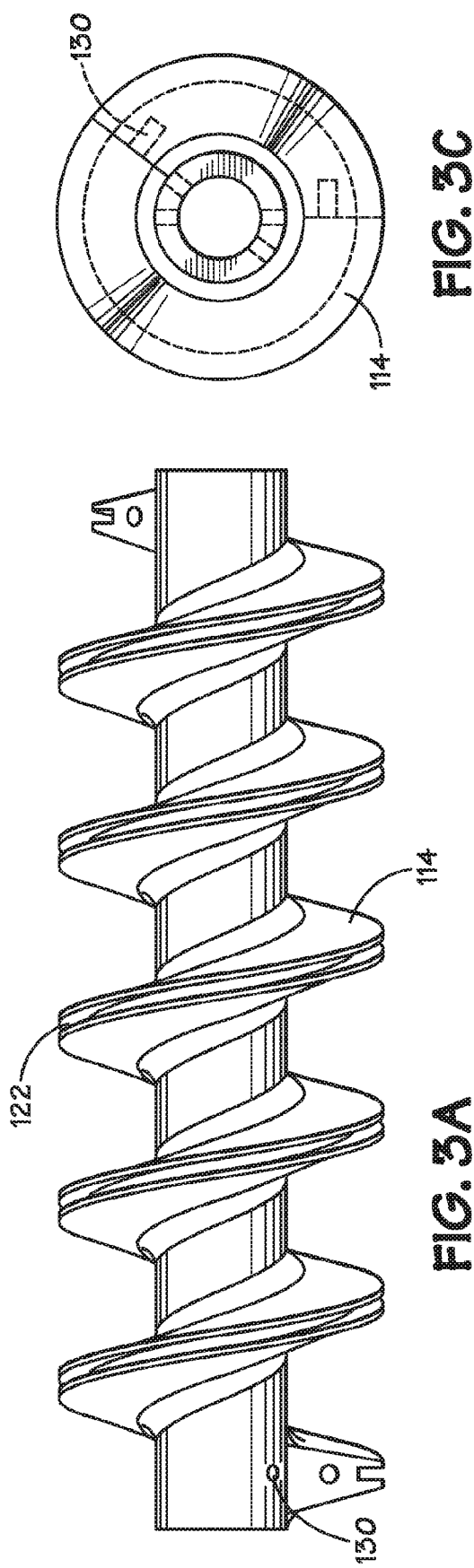
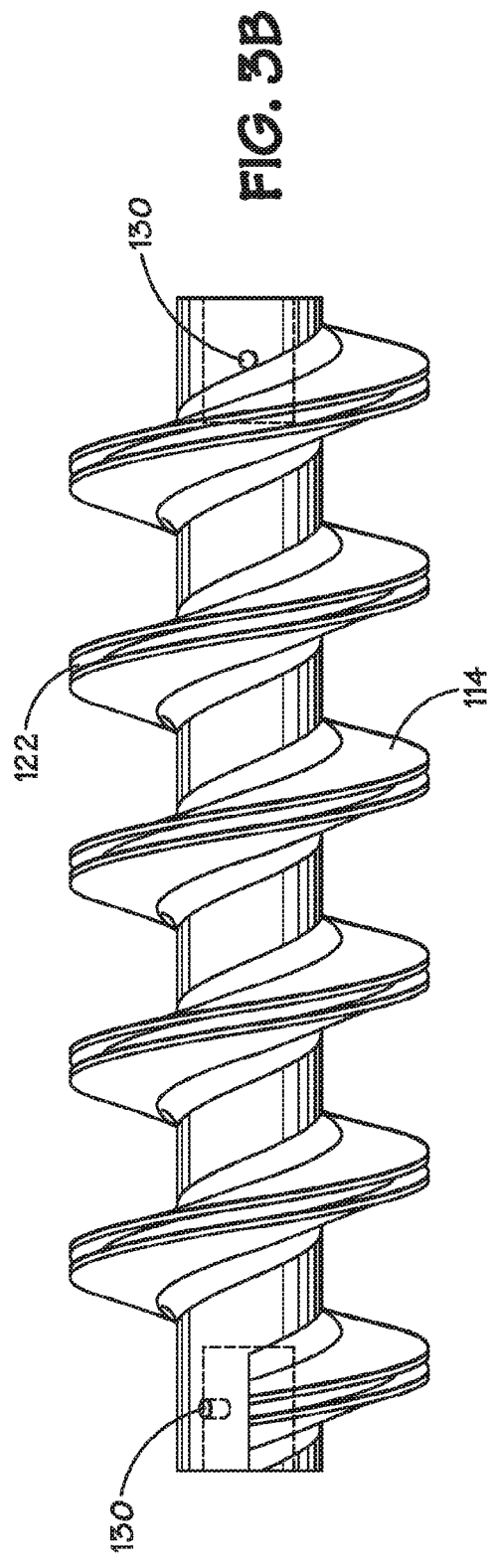
FIG. 3A
FIG. 3B
FIG. 3C

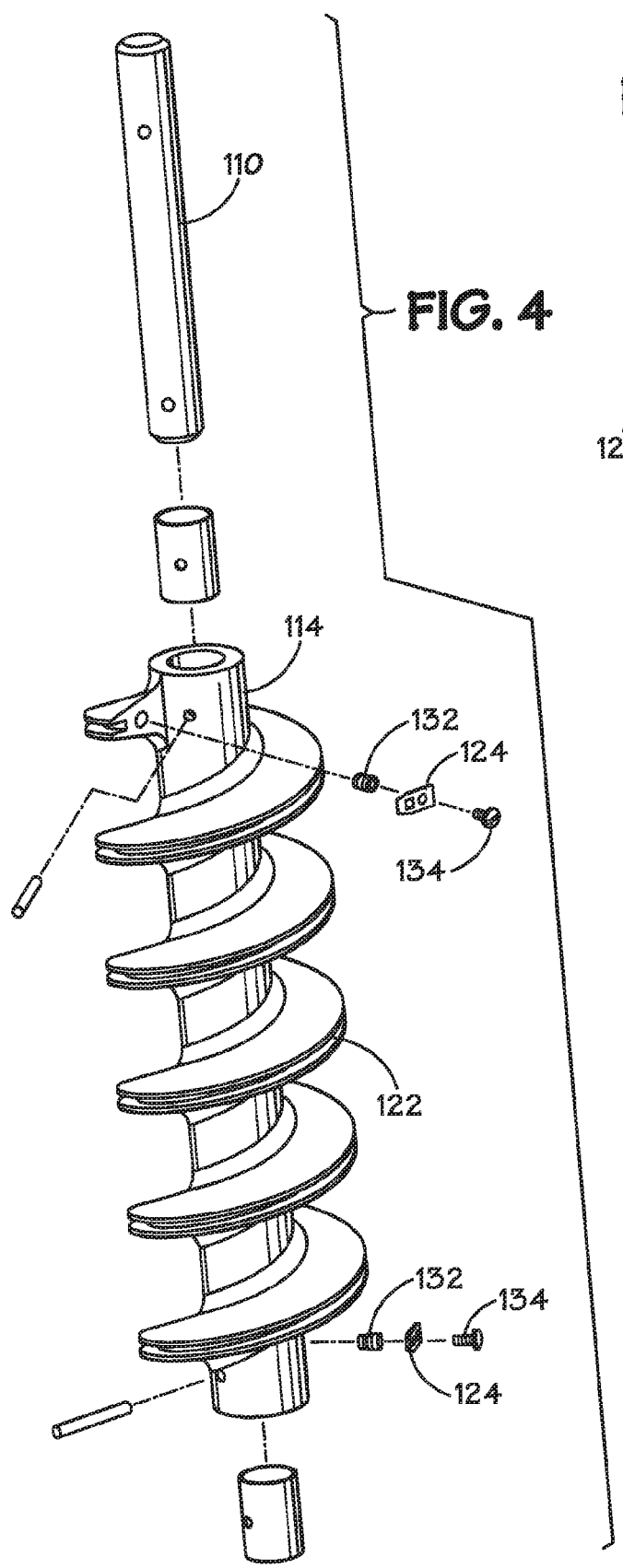
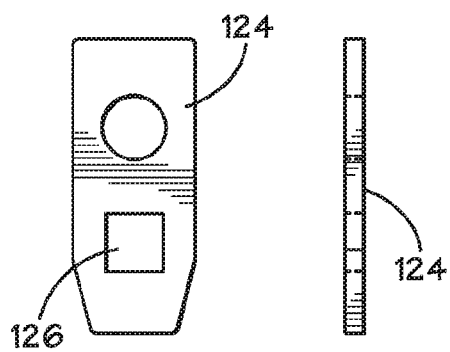
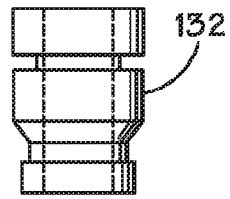
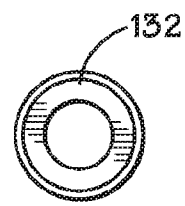

AUGER BRUSH

CROSS-REFERENCE TO RELATED APPLICATION

This application is a nonprovisional application of U.S. Provisional Patent Application No. 60/521,218, filed on Mar. 12, 2004, which is incorporated by reference in its entirety.

BACKGROUND

The present disclosure relates generally to waste disposal systems that are used to separate liquids from solids.

Food waste disposal systems are well known. One type of food waste disposal system includes a separator for separating food waste solids from liquids. The separator includes an auger surrounded by a cylindrical perforated screen. The waste conveyed by the auger and the liquid is extracted through the holes in the screen. During the separation process the perforated screen has a tendency to plug with solid waste. In some separators, the auger includes brush bristles attached to the auger so that when the auger rotates inside the screen, the brush cleans the screen. In known separators of this type, a metal-backed brush is glued to the auger, or bristles are inserted into holes along the perimeter of the auger, similar to the manner in which a hair brush is assembled.

A brush glued to the auger often does not stay attached to the auger during use, and if the bristles become worn or clogged, the brush is not easily replaceable. Similarly, with bristles inserted into holes in the auger, the bristles generally are not replaceable. Further, waste material tends to get trapped between the bristle bundles and cannot be removed.

SUMMARY

In accordance with the teachings of the present disclosure, an auger assembly suitable for use with a food separator is provided with a removable brush. The auger assembly includes an auger defining a channel around the crest thereof. A brush is received in the channel and defining a flange at each end thereof. First and second retaining clips are removably attached to opposite ends of the auger, with each retaining clip defining an opening therethrough that receives a respective flange to secure the brush within the channel.

In certain exemplary embodiments, the auger defines holes at the opposite ends that removably receive a fastener to attach the respective retaining clip to the auger. Screws are suitable fasteners, which are threaded into the holes. To facilitate fastening the retaining clips with screws, threaded inserts may be inserted into the holes.

BRIEF DESCRIPTION OF THE DRAWINGS

Other objects and advantages of the invention will become apparent upon reading the following detailed description and upon reference to the drawings in which:

FIG. 1 is a perspective view of an exemplary auger assembly.

FIGS. 2A and 2B illustrate the auger brush of the auger assembly shown in FIG. 1.

FIGS. 3A–3C illustrate details of the auger shown of the auger assembly shown in FIG. 1.

FIG. 4 is an exploded view of portions of the auger assembly shown in FIG. 1.

FIGS. 5A and 5B illustrate details of a threaded insert for the auger assembly shown in FIG. 1.

FIGS. 6A and 6B illustrate details of a brush retainer for the auger assembly shown in FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows an exemplary auger assembly in accordance with aspects of the teachings of the present disclosure. The auger assembly 100 is suitable for use in a food waste separator used to extract liquid from food waste. Generally, the auger assembly 100 is surrounded by a cylindrical perforated screen (not shown). Food waste is conveyed by the auger assembly 100 and liquid is extracted therefrom via the perforations in the screen, reducing the volume of the waste.

The auger assembly 100 includes a shaft 110 received by a bore 112 extending axially through an auger 114. A brush 116 extends around the crest of the auger, so that when the auger assembly 100 is turned, the brush 116 cleans the perforated screen that extends around the auger assembly 100.

The brush 116 is shown in FIGS. 2A and 2B, and FIGS. 3A–3C illustrate the auger 114 in detail. The brush 116 is received by a channel 122 in the auger 114 to attach the brush 116 to the auger 114. In this manner, the brush 116 is trapped in the channel 122 to securely connect it to the auger 114, preventing it from becoming disconnected during use while allowing it to be selectively removed for cleaning and/or replacement. As best shown in FIG. 2B, the brush 116 includes a flange 120 at each end. The brush 116 is attached to the auger 114 with retaining clips 124 that interact with the flanges 120.

As shown in FIG. 4, the auger 114 defines a hole 130 at the upper and lower ends of the auger 114. A threaded insert 132 is seated in each of the holes 130 that receives a screw 134 to fasten the retaining clips 124 to the auger 114. The details of the insert 132 and retaining clip 124 are shown in FIGS. 5 and 6, respectively. The retaining clips 124 define an opening 126 that receives the flange 120 to secure each end of the brush 116 within the channel 122. Thus, the clips 124 can be removed from the brush 116, the brush 116 unscrewed from the auger 114 and a new brush can be installed and refastened. This fastening method is "symmetrical" in that each end of the brush/auger is the same, so that the clips 124 are interchangeable.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

What is claimed is:

1. An auger assembly, comprising:
    an auger having a crest, the auger defining a channel around the crest thereof;
    a brush received in the channel, the brush defining first and second flanges extending from opposite ends thereof;
    first and second retaining clips removably attached to opposite ends of the auger, each retaining clip defining a plane and having first and second openings extending through the plane, the first opening of the first retaining clip receiving the first flange, the first opening of the second retaining clip receiving the second flange, the second openings each having a respective fastener extending therethrough to removably attach the fasteners to the auger and to secure the brush within the channel.

2. The auger assembly of claim 1, wherein the auger defines first and second holes at the opposite ends of the auger, each of the holes removably receiving one of the fasteners to attach the respective retaining clip to the auger.

3. The auger assembly of claim 2, wherein the fasteners comprise screws.

4. The auger assembly of claim 2, further comprising first and second inserts received by the first and second holes, respectively.

5. The auger assembly of claim 4, wherein the inserts are threaded.

6. The auger assembly of claim 5, wherein the fasteners comprise screws that are threadably received by the inserts.

7. A method of attaching a brush to the crest of an auger, comprising:
    inserting the brush into a channel defined by the auger;
    extending flanges defined at opposite ends of the brush into first openings in corresponding first and second retaining clips;
    extending first and second fasteners through second openings in the corresponding first and second retaining clips, the first and second openings extending through a common plane defined by the respective first and second retaining clips; and
    attaching the first and second fasteners to opposite ends of the auger to fasten the first and second retaining clips to the opposite ends of the auger.

8. The method of claim 7, wherein the auger defines first and second holes at the opposite ends of the auger, and wherein attaching the first and second fasteners includes inserting the first and second fasteners into the corresponding holes.

9. The method of claim 8, wherein the fasteners comprise screws, and wherein attaching the first and second fasteners includes turning the screws into the corresponding holes.

10. The method of claim 9, wherein attaching the first and second fasteners includes turning the screws into corresponding first and second inserts received by the first and second holes, respectively.

11. The auger assembly of claim 1, wherein the auger defines a bore extending axially therethrough, the auger assembly further comprising a shaft received by the opening.

12. The auger assembly of claim 1, wherein the first and second retaining clips each define a longitudinal axis, and wherein the first and second openings are generally both centered on the longitudinal axis.

13. The auger assembly of claim 1, wherein the opposite ends of the auger each have a surface defining a plane oriented generally parallel with an axis defined by the auger, and wherein the plane defined by the first and second retaining clips is generally parallel to the plane defined by the surfaces at the opposite ends of the auger.

14. The method of claim 7, wherein the opposite ends of the auger each have a surface defining a plane oriented generally parallel with an axis defined by the auger, the first and second holes at the opposite ends of the auger extending into the first and second surfaces and wherein inserting the first and second fasteners includes orienting the first and second fasteners generally transversely to the axis defined by the auger.

* * * * *